United States Patent [19]

Laran

[11] Patent Number: 4,481,182

[45] Date of Patent: Nov. 6, 1984

[54] SYNTHESIS OF COMPLEX BERYLLIUM HYDRIDES

[75] Inventor: Roy J. Laran, Greenwell Springs, La.

[73] Assignee: Ethyl Corporation, Richmond, Va.

[21] Appl. No.: 566,192

[22] Filed: Dec. 28, 1983

[51] Int. Cl.³ ............................................. C01B 6/24
[52] U.S. Cl. ................................................... 423/644
[58] Field of Search ....................................... 423/644

[56] References Cited

U.S. PATENT DOCUMENTS 3,383,187  5/1968  Rice et al. ............................ 423/644
3,647,399  3/1972  Ashby et al. ......................... 423/644

Primary Examiner—Herbert T. Carter

Attorney, Agent, or Firm—Donald L. Johnson; John F. Sieberth

[57] ABSTRACT

Alkali metal beryllium tetrahydride is produced by subjecting a mixture of beryllium and an alkali metal beryllium complex of the formula $MBeR_mH_n$ wherein M is an alkali metal, R is a hydrocarbyl group, m is an integer from 1 to 3, n is an integer from 0 to 2, the total of m and n being 3, to a pressurized atmosphere of hydrogen and an elevated temperature at which alkali metal beryllium tetrahydride of the formula $M_2BeH_4$ is produced.

27 Claims, No Drawings

SYNTHESIS OF COMPLEX BERYLLIUM HYDRIDES

This invention relates to a novel process for the synthesis of alkali metal beryllium tetrahydrides, such as dilithium beryllium tetrahydride, disodium beryllium tetrahydride, and the like.

U.S. Pat. No. 3,647,399 to Ashby and Kobetz describes the first successful synthesis of the alkali metal beryllium tetrahydrides. The process they employed involves the reaction of a beryllium dialkyl, $BeR_2$ (R=alkyl of 1 to 10 carbon atoms), with a compound of the formula $MAlR_3H$, $MAlR_2H_2$, or a mixture of both such compounds (M=alkali metal).

In accordance with this invention alkali metal beryllium tetrahydride is produced by subjecting a mixture of beryllium and an alkali metal beryllium complex of the formula $$MBeR_mH_n$$

wherein M is an alkali metal, R is a hydrocarbyl group, m is an integer from 1 to 3, n is an integer from 0 to 2, the total of m and n being 3, to a pressurized atmosphere of hydrogen and an elevated temperature at which alkali metal beryllium tetrahydride of the formula $M_2BeH_4$ is produced.

The beryllium employed in the process is preferably in sub-divided form such as flakes, chips, turnings, ribbon, powder, or the like. It may be used in relatively pure form or in the form of alloys such as beryllium-titanium, beryllium-zirconium, beryllium-titanium-zirconium, or the like, provided the alloy contains a sufficient quantity of beryllium to enable the desired reaction to take place. Preferred alloys contain 90 weight percent or more of beryllium.

The alkali metal beryllium complexes useful in the process comprise the alkali metal beryllium hydrocarbyl dihydrides, $MBeRH_2$; the alkali metal beryllium dihydrocarbyl hydrides, $MBeR_2H$; the alkali metal beryllium trihydrocarbyls, $MBeR_3$; and mixtures of any two or all three of these. The hydrocarbyl groups, R, may contain any suitable number of carbon atoms and may be aliphatic, cycloaliphatic, and/or aromatic. R may also be any suitably inert heterocyclic group, (groups in which the hetero atom(s) may be nitrogen, oxygen, etc.) or R may be any other inert substituted or unsubstituted cyclic or acyclic organic group which does not interfere with the desired reaction.

Exemplary hydrocarbyl compounds of this type include lithium beryllium ethyl dihydride, sodium beryllium butyl dihydride, potassium beryllium methyl dihydride, lithium beryllium phenyl dihydride, sodium beryllium cyclohexyl dihydride, sodium beryllium benzyl dihydride, potassium beryllium octadecyl dihydride, lithium beryllium phenethyl dihydride, lithium beryllium dimethyl hydride, sodium beryllium dipentyl hydride, potassium beryllium diethyl hydride, sodium beryllium bis(p-tolyl) hydride, sodium beryllium bis(cyclopentyl) hydride, sodium beryllium dibenzyl hydride, potassium beryllium bis(hexadecyl) hydride, lithium beryllium bis(phenethyl) hydride, lithium beryllium ethyl methyl hydride, lithium beryllium trimethyl, sodium beryllium tripropyl, potassium beryllium triethyl, sodium beryllium tris(p-ethylphenyl), sodium beryllium bis(cyclopentyl) ethyl, sodium beryllium tribenzyl, potassium beryllium tris(tetradecyl), lithium beryllium tris(cyclopropylcarbinyl), and the like. Sodium beryllium triethyl and equivalent sodium beryllium trialkyls, as well as their lithium counterparts are the preferred reactants.

The relative proportions between the beryllium and the alkali metal beryllium complex are not critical. Since the amount of the desired alkali metal beryllium tetrahydride formed is normally limited by the amount of the alkali metal beryllium complex employed, it is preferred to use this reactant in excess. It is desirable and convenient to use an excess of hydrogen.

Hydrogen pressures of at least about 10,000 psig will normally be employed, although in some cases reaction may proceed at lower pressures. Preferably the atmosphere is composed essentially entirely of dry hydrogen, although mixtures of hydrogen and other suitable gaseous materials, such as nitrogen, argon, etc., may be used if desired. Temperatures in the range of about 150° to about 350° C., and preferably in the range of about 200° to about 325° C., may be used. On the basis of available information, there is nothing critical about these reaction conditions provided of course that in any given case the pressure and temperature conditions selected result in the formation of the desired alkali metal beryllium tetrahydride and do not cause its decomposition.

The reaction may be conducted in bulk (i.e., no diluent is introduced into the reaction system). However it is deemed preferable to carry out the reaction in a suitable innocuous liquid diluent such as a hydrocarbon. Alkanes, cycloalkanes and aromatics are desirable materials for this use.

Use of agitation to insure intimate contact among the reaction components is recommended.

The following Example is illustrative of the process.

EXAMPLE

A 50 mL rocker-type high pressure reactor was charged, while in a dry box under an atmosphere of dry nitrogen, with 0.5 g of beryllium metal (ground to −325 mesh) containing 0.55% by weight of titanium metal, 10 mL of toluene, and 4.35 g of sodium beryllium triethyl. The toluene had been distilled from sodium aluminum tetrahydride and stored under dry nitrogen prior to use. The reactor was sealed, removed from the dry box, pressurized with hydrogen and heated with agitation to 200° C. and 14,400 psig total pressure. Total reaction time was 18 hours. The reaction resulted in the formation of 1.86 g of a gray powder. X-ray analysis of this product showed it to contain approximately 90% by weight of disodium beryllium tetrahydride, $Na_2BeH_4$. The product evolved 74.2 mmoles of hydrogen gas per gram.

The alkali metal beryllium tetrahydrides are useful as portable sources of hydrogen gas and as reducing agents in a variety of chemical synthesis reactions. Other known uses for the materials are referred to in U.S. Pat. No. 3,647,399 to Ashby and Kobetz, the disclosure of which is incorporated herein.

This invention is susceptible to considerable variation in its practice in accordance with the true spirit and scope of the ensuing claims.

What is claimed is:

1. A process which comprises subjecting a mixture of beryllium and an alkali metal beryllium complex of the formula $$MBeR_mH_n$$

wherein M is an alkali metal, R is a hydrocarbyl group, m is an integer from 1 to 3, n is an integer from 0 to 2, the total of m and n being 3, to a pressurized atmosphere of hydrogen and an elevated temperature at which alkali metal beryllium tetrahydride of the formula $M_2BeH_4$ is produced.

2. The process of claim 1 wherein m is 3 and n is 0.
3. The process of claim 1 wherein M is lithium.
4. The process of claim 1 wherein M is sodium.
5. The process of claim 1 wherein m is 3, n is 0 and M is lithium.
6. The process of claim 1 wherein m is 3, n is 0 and M is sodium.
7. A process which comprises subjecting an agitated mixture of finely divided beryllium and an alkali metal beryllium complex of the formula $$MBeR_mH_n$$

wherein M is an alkali metal, R is a hydrocarbyl group, m is an integer from 1 to 3, n is an integer from 0 to 2, the total of m and n being 3, to a pressurized atmosphere of hydrogen and an elevated temperature at which alkali metal beryllium tetrahydride of the formula $M_2BeH_4$ is produced.

8. The process of claim 7 conducted in an innocuous liquid reaction medium.
9. The process of claim 8 wherein m is 3 and n is 0.
10. The process of claim 8 wherein M is lithium.
11. The process of claim 8 wherein M is sodium.
12. The process of claim 8 wherein m is 3, n is 0 and M is lithium.
13. The process of claim 8 wherein m is 3, n is 0 and M is sodium.
14. A process which comprises subjecting an agitated mixture of finely divided beryllium and an alkali metal beryllium complex of the formula $$MBeR_3$$

wherein M is an alkali metal and R is a hydrocarbyl group, to a pressurized atmosphere of hydrogen and an elevated temperature at which alkali metal beryllium tetrahydride of the formula $M_2BeH_4$ is produced.

15. The process of claim 14 conducted in an innocuous liquid reaction medium.
16. The process of claim 15 wherein M is lithium.
17. The process of claim 15 wherein M is sodium.
18. The process of claim 15 wherein R is an alkyl group.
19. The process of claim 15 wherein the pressure is at least about 10,000 psig and the temperature is in the range of about 150° to about 350° C.
20. The process of claim 15 wherein R is an alkyl group, the liquid reaction medium is composed at least predominantly of an aromatic hydrocarbon, and for at least a predominant portion of the reaction (i) the pressure is at least about 10,000 psig and (ii) the temperature is in the range of about 200° to about 325° C.
21. The process of claim 14 wherein the finely divided beryllium is a beryllium-titanium alloy and the reaction is conducted in an innocuous liquid reaction medium.
22. A process which comprises subjecting a mixture of (i) a beryllium alloy containing at least 90% by weight of beryllium, said alloy being selected from the group consisting of beryllium-titanium, beryllium-zirconium, and beryllium-titanium-zirconium, and (ii) an alkali metal beryllium complex of the formula $$MBeR_mH_n$$

wherein M is an alkali metal, R is a hydrocarbyl group, m is an integer from 1 to 3, n is an integer from 0 to 2, the total of m and n being 3, to a pressurized atmosphere of hydrogen and an elevated temperature at which alkali metal beryllium tetrahydride of the formula $M_2BeH_4$ is produced.

23. The process of claim 22 wherein m is 3 and n is 0.
24. The process of claim 22 wherein M is lithium.
25. The process of claim 22 wherein M is sodium.
26. The process of claim 22 wherein m is 3, n is 0 and M is lithium.
27. The process of claim 22 wherein m is 3, n is 0 and M is sodium.

* * * * *